United States Patent [19]
Roach

[11] Patent Number: 5,999,172
[45] Date of Patent: Dec. 7, 1999

[54] MULTIMEDIA TECHNIQUES

[76] Inventor: Richard Gregory Roach, 12840 SE 3rd St., Bellevue, Wash. 98005

[21] Appl. No.: 08/975,857

[22] Filed: Nov. 21, 1997

Related U.S. Application Data

[63] Continuation-in-part of application No. 08/263,856, Jun. 22, 1994, Pat. No. 5,692,212.

[51] Int. Cl.⁶ ........................................................ G06F 3/100
[52] U.S. Cl. ............................................. 345/302; 345/473
[58] Field of Search ..................................... 345/302, 473, 345/474, 475; 273/434, 437

[56] References Cited

U.S. PATENT DOCUMENTS

| | | | |
|---|---|---|---|
| 4,305,131 | 12/1981 | Best | 395/152 |
| 4,445,187 | 4/1984 | Best | 395/152 |
| 4,569,026 | 2/1986 | Best | 395/152 |
| 5,111,409 | 5/1992 | Gasper et al. | 395/154 |
| 5,274,758 | 12/1993 | Beitel et al. | 395/154 |
| 5,358,259 | 10/1994 | Best | 273/434 |

*Primary Examiner*—Phu K. Nguyen
*Assistant Examiner*—Cliff N. Vo
*Attorney, Agent, or Firm*—Wendy Buskop; Bayko Gibson et al

[57] ABSTRACT

Interactive movie techniques disclosed include dialogue lines for computer users, gateways for entering alternate storylines, techniques for conveying information relating to a character's thoughts and memories, techniques for conveying character information to the user by selection of character backgrounds, the use of icons to signal the presence of additional storyline information or user activities as an interactive movie character, and techniques to draw the user into the flow of the storyline to impart the experience of "having been there".

50 Claims, No Drawings

MULTIMEDIA TECHNIQUES

CROSS REFERENCES TO RELATED APPLICATIONS

This application is a continuation in part of copending application Ser. No. 08/263,856, filed Jun. 22, 1994, now to be U.S. Pat. No. 5,692,212, issued Nov. 25, 1997.

BACKGROUND OF THE INVENTION

This invention relates to conveying an interactive story by use of a computer.

The conveying of information via computers is a new field. One of the ways in which this new field is different from old methods of conveying information, such as books, movies, television, and video and sound recordings, is in the ability of the user to interact with the information source. Also, accessing particular items of information is nearly instantaneous using the new technology.

Little has been done using conventional movie techniques to perform audiovisual works from a first person perspective. So little has been done that interactive movies are largely a new art form. Permitting the user to access alternate storylines, to receive information outside of the main storyline, to access a character's thoughts and memories, are all capabilities that need to be developed in order to popularize this new technology.

OBJECTS OF THE INVENTION

It is an object of this invention to provide a technique for permitting a computer user to engage in dialogue with a character in an audiovisual work.

It is another object of this invention to provide an audiovisual work that has alternate storylines.

It is another object of this invention to provide a technique for permitting a computer user to enter alternate storylines for an audiovisual work.

It is another object of this invention to provide interactive movie techniques for conveying information to a computer user relating to character's thoughts and memories, from a first person perspective.

It is another object of this invention to provide a technique for permitting a user to access additional information pertaining to a storyline without loss of continuity of the storyline.

FURTHER OBJECTS OF THE INVENTION

It is another object of this invention to provide a technique for a computer user to receive images from a third person perspective showing the carrying out of a commanded action, which images are integrated into the visual display without loss of continuity.

It is another object of this invention to provide small elements of cinematic action which can be effectively integrated with a number of different clips to alter the meaning of the cinematic sequence in which they appear.

It is another object of this invention to provide an icon technique for initiating a conversation sequence among characters in an interactive movie.

SUMMARY OF THE INVENTION

One embodiment of the invention provides a method for displaying a cinematic sequence of events to a computer user who is playing the part of a user controlled character in an interactive movie. The cinematic sequence of events is transmitted by the computer to the user through an audio interface and a visual interface operatively associated with the computer. The cinematic sequence of events comprises a first sequence of images, a second sequence of images, and a third sequence of images. The computer is caused to output the first sequence of images as viewed from a first person perspective, the second sequence of images as viewed from a third person perspective, and the third sequence of images as viewed from the first person perspective. The last image in the first sequence of images has cinematic continuity with the first image in the second sequence of images and the last visual image in the second sequence of images has cinematic continuity with the first image in the third sequence of images. The images of the second sequence of images are output in response to input of a command by the user to have a character in the interactive movie complete an action.

By switching to a third person perspective, the dramatic effect of the commanded action is enhanced for the user. The switch also facilitates maintaining continuity in the delivery of the interactive movie to the user, as the sequences can initiated quite naturally as a cut from the previous sequence.

Another embodiment of the invention provides a method for using a computer to alter the meaning of a sequence of a first clip and a second clip output to a computer user who is playing the part of a user-controlled character in an interactive movie. The interactive movie can be characterized as a sequence of clips being transmitted by the computer to the user through an audio interface and a visual interface operatively associated with the computer. The user controls the user-controlled character by inputting commands to the computer to have the user-controlled character complete actions. Generally speaking, the first clip is of the user-controlled character completing an action, and the second clip is of another character acting in response to the completed action of the user-controlled character. The method is carried out by storing a third clip in a computer memory device operatively associated with the computer as well as the commands input by the user to have the user-controlled character complete actions. The third clip is output to the user between the output of the first clip and the second clip when the commanded action has a predetermined relationship with at least one previous command by the user. In another aspect, this embodiment of the invention provides a method for using a computer to convey a comment to a computer user who is playing the part of a user-controlled character in an interactive movie. The inactive movie is transmitted by the computer to the user through an audio interface and a visual interface operatively associated with the computer. The comment is conveyed to the user by a another character in the interactive movie in response to a command input to the computer by the user to have the user-controlled character complete an action. The computer is caused to output a visual image of the other character on the visual interface in response to the command input by the user to have the user-controlled character complete an action, and then caused to output the comment through the audio interface, in coordination with speaking movements of the other character on the visual interface.

By using small clips of dramatic action that are visually composed in such a way that they can be integrated between a number of different clips, and change their meaning, a cinematic tool is created which is extremely versatile.

Another embodiment of the invention provides a method for a computer user who is playing the part of a user controlled character in an interactive movie being transmitted by the computer to the user through an audio interface and a visual interface operatively associated with the computer to input a command to the computer. An icon representing the command is displayed on the visual interface, the user drags the icon onto an image appearing on the visual interface, and the icon is dropped onto the image, which is usually a character in the interactive movie. In such case, the command causes the character to output a dialogue line through the audio interface.

By using icons which represent an element of or idea from the narrative, great flexibility is provided for the user in initiating various conversations with various characters in the interactive movie.

Further in accordance with the invention, methods are provided for making computer memory devices for carrying out the above methods, as well as memory devices suitable for transferring the required databases and instructions to end user computers.

DETAILED DESCRIPTION OF THE PREFERRED EMBODIMENTS

In one embodiment of the invention, there is provided a computer memory device. An example of a suitable memory device is a CAROM disc. The memory device causes a computer to convey a branch of a storyline to a computer user who is playing a participants part in the storyline. The branch of the storyline is output from the computer through an audio interface and visual interface operatively associated with the computer. The computer is also operably associated with a reader for the memory device and a suitably sized internal memory to accommodate the data flow from the reader.

The branch of the storyline begins with a first dialogue line conveyed to the user by an actor though the audio interface and the visual interface. The user is provided with response options to the first dialogue line. Options can be displayed as written responses appearing in a box on the visual interface, or in the form icons depicting emotional responses, for example. A second dialogue line is output by the computer through the audio interface based on the user's selected response option. The second dialogue line is predetermined based on the response option selected by the user. The second dialogue may or may not replicate the written form. Greater user interaction is stimulated when the audio does not precisely track the written response. A third dialogue line is then conveyed to the user by the actor through the audio interface and the visual interface. The third dialogue line is predetermined based at least in part on the response option selected by the user.

The computer memory device has recorded thereon the data and instructions necessary to carry out this exchange. Digital information is necessary to generate the visual and audio outputs. The necessary information is provided by a digital database having a first portion representing a first image of the actor, a second portion representing the first dialogue line, a third portion representing response options to the first dialogue line, a fourth portion representing the second dialogue line, a fifth portion representing a second image of the actor, and a sixth portion representing the third dialogue line. The instructions recorded on the computer memory device include instructions for causing the computer to output, through the visual interface, the first image of the actor from the first portion of the digital database, instructions for causing the computer to output, through the audio interface, the first dialogue line from the second portion of the digital database, instructions for causing the computer to output, through the visual interface, a plurality of response options to the first dialogue line from the third portion of the digital database, instructions for causing the computer to receive and process a selected desired response option input to the computer by the user, instructions for causing the computer to output, through the audio interface, the second dialogue line responsive to the response option selected by the user from the fourth portion of the digital database, instructions for causing the computer to output, through the visual interface, the second image of the actor from the fifth portion of the digital database, and instructions for causing the computer to output, through the audio interface, the third dialogue line from the sixth portion of the digital database. The steps to record the necessary information on the computer memory device are known. The storyline, or lines, are preferably scripted so that the outputs from the interface follow a predetermined sequence for the various lines.

In another embodiment of the invention, the above described computer memory device is made by recording the above noted data and instructions on the computer memory device. This produces a product which can be distributed to end users.

In another embodiment of the invention, a user uses a computer memory device, such as the one previously described, to cause a computer to convey a branch of a storyline. The computer is provided with audio and visual interfaces and a reader for the memory device. The user causes the computer to output, through the visual interface, a first image of the actor. The computer is then caused to output, through the audio interface, the first dialogue line. A plurality of response options to the first dialogue line are then output through the visual interface. The user selects a desired response option. The computer then outputs through the audio interface the second dialogue line responsive to the response option selected by the user. The second dialogue line reflects the user's response to the first dialogue line. The computer then outputs, through the visual interface, a second image of the actor, and through the audio interface, the third dialogue line. The second dialogue line is preferably delivered in the voice of the central character through whom the user is controlling the movie.

The third dialogue line is determined at least in part by the user's selected response option. In one embodiment of the invention, there is provided a plurality of possible third dialogue lines, and one is selected for output based in part on the response option selected by the user and in part based on earlier options selected by the user. For example, where the user has consistently selected angry responses, the third dialogue line can be selected to be combative. A mechanism for changing the path of the storyline based on the user response pattern is thus provided according to this embodiment.

In one embodiment, the user's response choices are used to change the tenor of the movie line. An emotional value, such as anger, openness, evasiveness, etc., termed an "uber" value, is assigned to at least a portion of the responses made by the user. These values have a value assigned to them, and their cumulative value is tracked. For example, an angry response can be assigned an uber value of 1, an open response can be assigned an uber value of 2, and a guarded response can be assigned an uber value of 3. Where the cumulative value of these responses is low, for example, it indicates that the user has selected consistently angry responses, and the third dialogue line and accompanying visual output can be selected which is appropriate for an angry user. Music and color schemes can accompany the third dialogue line which are appropriate for its content The music and color schemes can be preselected or they can be synthesized by the computer from music and color scheme databases provided on the computer memory device.

In another aspect of this embodiment of the invention, the computer is caused to output, through the visual interface, a computer generated location scene. Preferably, the scene appears from the perspective of the user. The images of the actor are superposed over the computer generated location scene. This effect can be produced by shooting the actors against a blue screen, digitizing the resulting video, and applying the digitized video to the computer generated location scene. If desired, the images of the actors can be output through windows formed on the visual interface.

In another embodiment of the invention, a computer is used to convey character information relating to a character in an audiovisual work. The information is conveyed by an abstract background scene for the character. The background scene is preferably computer generated, although a photograph having the desired background scene could be scanned into the computer database if desired The computer is provided with a digital database which can be processed by the computer to produce the desired scene. The image of the actor playing the part of the character is superimposed on the computer generated abstract background. Abstract design and color schemes form highly effective backgrounds to affect the user's perceptions of the character of the actor. The technique is highly effective in a windowed environment. When carried out in this fashion, the scene appears in a window which is output on the visual interface. The back-ground can change during the course of the storyline, as the user's perceptions change, or at least some of the characteristics of the background can remain constant and unchanging, thus providing a motif for the character. Suitable designs include solar or atomic symbols, polygons, and puzzles, for example.

In another embodiment of the invention, a computer is used to convey information which is optional to a main storyline being output as an audiovisual work from a computer. The information is output without loss of continuity of the main storyline. The method is carried out by causing the computer to output the audiovisual work through audio and visual interfaces. At certain times during the output, the computer is caused to display an information icon. The information icon is associated with information which is optional to the main storyline and is stored in a computer memory device which forms a database operatively associated with the computer. The user is provided with the option of causing the computer to access and output the information stored in association with the icon. To preserve the continuity of the storyline, the output of the main storyline is paused upon receipt of the access command from the user. Upon completion of output of the information stored in association with the icon, the computer continues the output of the main storyline. The technique is highly effective when used to output optional storyline information, such as object details, character thoughts, and conversation inputs from other characters. The icon technique may also be used to provide the user with a stored command to move to a new physical location in the storyline. For example, the icon can represent a "go to" command such as "Go to help Able." Upon actuation, the user will experience of moving from a first physical location to a second physical location in the story, and the storyline will change to an alternate version. In another embodiment of the invention, the icon may be used to store a retrievable query by the user. For example, the query may be "Where is Able?" Suitable means, such as a cursor, are provided so that the user can direct the query at a character appearing on the interface, actuate the query, receive an output of the query in audio form, access the database associated with the query icon, and receive an audiovisual response to the query. One technique by which the query can be activated is by the use of the cursor. The user causes the cursor to move on the visual interface. The computer is caused to display the information icon in active form on the visual interface in response to the cursor being moved into a predetermined area on the visual interface, such as in registry with the icon. In one embodiment, the cursor can be used to drag the icon to a target area, and then causing the computer to access the associated database.

Interactive movies provide an excellent medium for conveying a story from a first person perspective. Traditional movie techniques are not highly effective for conveying a story from a first person perspective or for conveying visual information relating to a character's thoughts or memories. In another embodiment of the invention, there is provided a method for using a computer to convey information relating to a character's thoughts. A double exposure effect is used. The computer caused to output a first scene to the computer user through the visual interface. The first scene can depict the character's thoughts, or the character's physical location, for example. A second scene representing the character's thoughts is simultaneously output through the visual interface. The output characteristics, such as brightness, of the first scene and second scene are determined so that the output of the first scene visually dominates the output of the second scene. If desired, the second scene can be output as a window in the visual output in the first scene, with or without the double exposure effect. The scenes can be premixed and stored on the computer memory device in premixed form, or the scenes can be separately stored on the computer memory device and blended on the fly by providing suitable computer instructions. The scenes can be blended to convey emotion, such as confusion, for example.

In another embodiment of the invention, the dialogue is caused to jump from window to window. A visual image of the actor appears in a first window on the visual interface. The computer is caused to output, through the audio interface, a first dialogue line. The output of the first dialogue line is coordinated with the speaking movements of the actor in the first window. A visual image of the actor is caused to appear in a second window on the visual interface. The computer is then caused to output, through the audio interface, the second dialogue line, in coordination with the speaking movements of the actor. The second dialogue line follows the completion of the first dialogue line. Preferably, the first visual image of the actor is paused after the actor delivers the first dialogue line. The effect is striking, especially when used to output emotional exchanges between characters taking part in the storyline. The technique also overcomes the continuity problems associated with interactive movies according to prior art techniques. In another aspect of this embodiment, the user enters the exchange of dialogue lines. The actor delivers the first dialogue line, the user selects and causes the computer to output through the audio interface the second dialogue line, and the actor delivers a responsive third dialogue line. Full screen outputs of the first visual image and the second visual image are effective when the user is involved in the dialogue. Using a computer generated abstract background for the actors is preferred.

DETAILED DESCRIPTION OF FURTHER PREFERRED EMBODIMENTS

In a further preferred embodiment of the invention, when the user makes a choice inside of the virtual environment (which is shown via a first person view), the results of that choice and the dramatic action associated with it, are shown in a third person sequence that is quickly integrated into the visual display.

For example, the player may presented with a first person view of a wall which contains a door. The player chooses to knock on the door by clicking on it's image inside of the screen display. Once they do, a brief cinematic sequence of the virtual character knocking on the door is shown. The first and last shots in the sequence are designed in such a way that they will visually integrate properly with the controlling POV view—maintaining appropriate visual continuity.

This embodiment of the invention provides a method for displaying a cinematic sequence of events to a computer user who is playing the part of a user controlled character in an interactive movie. The cinematic sequence of events is transmitted by the computer to the user through an audio interface and a visual interface operatively associated with the computer. The cinematic sequence of events comprises a first sequence of images, a second sequence of images, and a third sequence of images. The computer is caused to output the first sequence of images as viewed from a first person perspective, the second sequence of images as viewed from a third person perspective, and the third sequence of images as viewed from the first person perspective. The last image in the first sequence of images has cinematic continuity with the first image in the second sequence of images and the last visual image in the second sequence of images has cinematic continuity with the first image in the third sequence of images. The images of the second sequence of images are output in response to input of a command by the user to have a character in the interactive movie complete an action.

Usually, the character which is commanded to complete the action is the user controlled character. In such case, the images of the second sequence of images are images of the user controlled character completing the action. Preferably, the images appear as viewed from the perspective of a third person. Generally speaking the input is received from the user during the output of a last image in the first sequence of images. The necessary time for user response can be provided by looping the image sequence, for example.

Preferably, the user views a major part of the interactive movie through the eyes of the user controlled character. In such case, the first sequence of images and the third sequence of images are images of an environment as viewed by the user-controlled character in the interactive movie from the first person perspective. In order to further involve the user in the experience of the interactive movie, the user is given choices to make regarding the actions of the user-controlled character. Preferably, the user input is selected from a plurality of possible actions for the user controlled character to complete. For example, the user-controlled character can be commanded to open a door, pick something up, or ask various questions.

When completion of selected action by the user-controlled character does not change the environment as viewed by the user-controlled character, the first sequence of images and the third sequence of images will be the same. On the other hand, where the completion of the selected action by the user controlled character changes the environment as viewed by the user controlled character and the first sequence of images and the second sequence of images will be different. To provide cinematic continuity, it is preferred that the cinematic relationship between the first sequence of images and the second sequence of images, and the second sequence of images and the third sequence of images, be cuts.

Techniques for digitizing the imagery are believed to be within the skill of those in the art, given knowledge of the desired result as described above. Generally speaking, in the preferred embodiment, a digital database having a first digital database portion containing the first sequence of images as viewed from a first person perspective, a second digital database portion containing the second sequence of images as viewed from a third person perspective, and a third digital database portion containing the third sequence of images as viewed from a first person perspective, are recorded on a computer memory device. The last visual image in the first sequence of images has sequence continuity with a first visual image in the second sequence of images. Instructions are provided for causing the computer to retrieve and output the sequence of images to the user through the visual interface in response to input by the user of a command to have a character in the interactive movie complete an action. The instructions are conveniently provided on the same computer memory device, such as a CD-ROM. Preferably, the command is for the user controlled character to complete an action and the second sequence of images is of the user controlled character completing the action from a third person point of view.

The method results in a computer memory device having recorded thereon a digital database having the first, second and third digital database portions containing the sequences of images, together with the necessary instructions to cause the computer to retrieve and output the sequences of images to the user through the visual interface upon receipt of the command.

In another further preferred embodiment of the invention, small elements of dramatic cinematic action are visually composed in such a way that they can be integrated with a number of different clips so as to alter the meaning of a cinematic sequence in which they appear.

For example, the player may ask a question of a character represented on the screen, such as by choosing from a list or via some other means. A cinematic sequence can be presented as follows:

1) The character which is being controlled by the player is shown asking the question.
2) The target of the inquiry answers.

When the player re-asks the same question a second time, the sequence can be altered as follows:

1) The character which is being controlled by the player is shown asking the question.
2) An "atom" of the target character saying "I just told you" plays.
3) The original answer clip plays.

In one aspect, this embodiment of the invention provides a method for using a computer to alter the meaning of a sequence of a first clip and a second clip output to a computer user who is playing the part of a user-controlled character in an interactive movie. The interactive movie can be characterized as a sequence of clips being transmitted by the computer to the user through an audio interface and a visual interface operatively associated with the computer. The user controls the user-controlled character by inputting commands to the computer to have the user-controlled character complete actions. Generally speaking, the first clip is of the user-controlled character completing an action, and the second clip is of another character acting in response to the completed action of the user-controlled character. The method is carried out by storing a third clip in a computer memory device operatively associated with the computer as well as the commands input by the user to have the user-controlled character complete actions. The third clip is output to the user between the output of the first clip and the second clip when the commanded action has a predetermined relationship with at least one previous command by the user. In the above example, the predetermined relationship between the commanded action and the at least one previous command is identity with the at least one previous command. However, the invention is not limited to outputting the third clip only where there is identity. The third clip could be output, for example, where the user has input a series of hostile commands.

Generally speaking, the third clip will alter the meaning of the interactive movie, that is, the meaning of the output of the first clip, the third clip, and the second clip, is different from the meaning of the output of the first clip and the second clip. The cinematic effect of the output of the first clip, the third clip, and the second clip is also different from the cinematic effect of the output of the first clip and the second clip.

Preferably, the first clip is a third person view of the user controlled character completing the action and third clip is a close-up shot of the other character from a first person view. In the above example, the third clip can be a close up shot of the other character commenting on having previously acted in response to the completed action of the user-controlled character.

Techniques for digitizing the necessary information are believed to be within the skill of those in the art, given knowledge of the desired result as described above. Generally speaking, in the preferred embodiment, a digital database containing a first digital database portion containing images of the user-controlled character completing an action, a second digital database portion containing images of the other character acting in response to the completed action of the user-controlled character, and a third digital database portion containing images of the other character commenting on the completed action of the user controlled character, is recorded on a computer memory device such as a CD-ROM. Instructions are also recorded on the computer memory device for causing the computer to store, in a computer memory means, the commands input by the user to have the user-controlled character complete actions, and for causing the computer to output the third digital database portion to the user between the output of the first digital database portion and the second digital database portion when a commanded action has a predetermined relationship with at least one previous command. The meaning of the output of the first digital database portion, the third digital database portion, and the second digital database portion, is preferably different from the meaning of the output of the first digital database portion and the second digital database portion. As an example, the instructions can cause the third digital database portion to be output when a commanded action has identity with a previously commanded action as stored in the computer memory device.

The method results in the production of a computer memory device having recorded thereon a digital database having the first, second and third digital database portions together with the necessary instructions to cause the computer to store the user commands and to output the third digital database portion to the user between the output of the first digital database portion and the second digital database portion when a commanded action has a predetermined relationship with at least one previous command. Preferably, the meaning of the output of the first digital database portion, the third digital database portion, and the second digital database portion, is different from the meaning of the output of the first digital database portion and the second digital database portion. As an example, the instructions can cause the third digital database portion to be output when a commanded action has identity with a previously commanded action as stored in the computer memory means.

In another aspect, this embodiment of the invention provides a method for using a computer to convey a comment to a computer user who is playing the part of a user-controlled character in an interactive movie. The interactive movie is transmitted by the computer to the user through an audio interface and a visual interface operatively associated with the computer. The comment is conveyed to the user by a another character in the interactive movie in response to a command input to the computer by the user to have the user-controlled character complete an action. The computer is caused to output a visual image of the other character on the visual interface in response to the command input by the user to have the user-controlled character complete an action, and then caused to output the comment through the audio interface, in coordination with speaking movements of the other character on the visual interface.

Generally speaking, the output of the visual image and the comment will follow completion of the commanded action by the user controlled character. The commanded action will usually pertain to having the user-controlled character interact in some manner with the other character, such as by asking a question. The visual image and comment will usually be stored in a computer memory device operatively associated with the computer and be retrievable for output to the user in response to any of a plurality of predetermined command combinations input by the user during the course of the interactive movie, such as where the user inputs a command to have the user-controlled character complete a previously commanded action. The comment will often pertain to the predetermined command combination.

A desirable cinematic effect is achieved by appropriate switches of points of view. For example, the computer can be caused to output a visual image of the user-controlled character complete the commanded action as viewed from a third person perspective; and then to output the visual image of the other character on the visual interface as viewed from a first person perspective of the user controlled character. The effect is particularly desirable when the visual image of the other character is a close-up shot. After delivery of the comment, the computer can be caused to output a visual image of an environment which includes the other character with the cinematic relationship between the close-up image on the visual image of the environment which includes the other character being characterized as a cut. If desired, the visual image of the environment which includes the other character can be an over-the-shoulder shot of the user controlled character.

The method of making the computer memory device and its characteristics can be as in the previously described aspect of this embodiment.

In still another further embodiment of the invention, a small icon which represents an element of or idea from the narrative is provided which the player can drag onto characters appearing on the screen causing a cinematic conversation sequence (between the player controlled character and the other virtual characters in the story) on such topic to play as a result.

As an example, suppose the player has just seen an automobile accident occur. Upon entering a nearby building, there are two characters represented in the scene. An icon representing the accident appears at the tops of the screen The player may click on the icon and, while holding down the control button on their input device, drag the icon onto the representation of either of the two characters. Depending upon which character was targeted, the appropriate conversation sequence will play.

This embodiment of the invention provides a method for a computer user who is playing the part of a user controlled character in an interactive movie being transmitted by the computer to the user through an audio interface and a visual interface operatively associated with the computer to input a command to the computer. An icon representing the command is displayed on the visual interface, the user drags the icon onto an image appearing on the visual interface, and the icon is dropped onto the image, which is usually a character in the interactive movie. In such case, the command causes the character to output a dialogue line through the audio interface.

The interactive movie often comprises a storyline composed of a main sequence of events output to the user from the computer through the audio interface and the visual interface, and the icon represents an event from the storyline. The dialog line will often convey information related to the event represented by the icon. Where the user is playing the part of a user controlled character in the interactive movie by inputting commands to the computer to have the user-controlled character complete actions, the commands in accordance with this embodiment of the invention are input by dragging and dropping the icon.

The commanded action will often be for the user controlled character to interact with another character. In such case, the image onto which the icon is dropped will be that of the other character. Preferably, the command causes the computer to output an image of the user controlled character completing the commanded action from a third person point of view, and more preferably, further causes the computer to output an image of the other character responding to the completed action of the user controlled character.

Techniques for digitizing the necessary information are believed to be within the skill of those in the art, given knowledge of the desired result as described above. Generally speaking, in the preferred embodiment, a digital database having a first digital database portion containing images of a user-controlled character completing an action, and a second digital database portion containing images of another character acting in response to the completed action of the user-controlled character, is recorded on a computer memory device such as a CD-ROM. Instructions are also recorded on the computer memory device for causing the computer to display an image of an icon representing a command for the user controlled character to complete the action on the visual interface and for causing the computer to move the and drop the image of the icon in response to user commands. Instructions are further recorded on the computer memory device for causing the computer to output the first digital database portion and the second digital database portion in response to the user dropping the icon on a selected hot spot on the visual interface.

For greater effect, it is preferred to record on the computer memory device a plurality of different second digital database portions containing images of different characters acting in response to the completed action of the user-controlled character; and instructions for causing the computer to select a second digital database portion for output based on the selected hot spot. The first digital database portion contains images from a third person point of view and the second digital database portion contains images from a first person point of view.

The method results in the production of a computer memory device having recorded thereon a digital database having the first and second digital database portions together with the necessary instructions to cause the computer to display an image of an icon representing a command for the user controlled character to complete the action on the visual interface, to cause the computer to move the and drop the image of the icon in response to user commands, and to cause the computer to output the first digital database portion and the second digital database portion in response to the user dropping the icon on a selected hot spot on the visual interface. Preferably, there is further recorded on the computer memory device a plurality of different second digital database portions containing images of different characters acting in response to the completed action of the user-controlled character, and instructions for causing the computer to select a second digital database portion for output based on the selected hot spot. Most preferably, the first digital database portion contains images from a third person point of view and the second digital database portion contains images from a first person point of view.

While certain preferred embodiments of the invention have been described herein, the invention is not to be construed as being so limited, except to the extent that such limitations are found in the claims.

What is claimed is:

1. A method for displaying a cinematic sequence of events to a computer user who is playing the part of a user controlled character in an interactive movie being transmitted by the computer to the user through an audio interface and visual interface operatively associated with the computer, wherein said cinematic sequence of events comprises a first sequence of images, a second sequence of images, and a third sequence of images, wherein said method for displaying the cinematic sequence of events comprises causing the computer to output the first sequence of images as viewed from a first person perspective, causing the computer to output the second sequence of images as viewed from a third person perspective, and causing the computer to output the third sequence of images as viewed from a first person perspective;

wherein a last image in the first sequence of images has cinematic continuity with a first image in the second sequence of images and a last visual image in the second sequence of images has cinematic continuity with a first image in the third sequence of images, and the images of the second sequence of images is output in response to input of a command by the user to have a character in the interactive movie complete an action.

2. A method as in claim 1 wherein the images of the second sequence of images are images of the character completing the action as viewed from the third person perspective, wherein the character is a user controlled character.

3. A method as in claim 1 wherein the input is received from the user during the output of a last image in the first sequence of images.

4. A method as in claim 3 wherein the first sequence of images and the third sequence of images are images of an environment as viewed by the character in the interactive movie from the first person perspective.

5. A method as in claim 4 wherein the input is selected from a plurality of possible actions for the character to complete, wherein the user controls the character.

6. A method as in claim 5 wherein completion of selected action by the user-controlled character does not change the environment as viewed by the user-controlled character and the first sequence of images and the third sequence of images are the same.

7. A method as in claim 5 wherein completion of the selected action by the user controlled character changes the environment as viewed by the user controlled character and the first sequence of images and the second sequence of images are different.

8. A method as in claim 1 wherein the first sequence of images and the second sequence of images have a cinematic relationship characterized as a cut, and the second sequence of images and the third sequence of images have a cinematic relationship characterized as a cut.

9. A method for making a computer memory device for causing a computer to
   display a cinematic sequence of events to a computer user who is playing the part of a user-controlled character in an interactive movie being transmitted by the computer to the user through an audio interface and a visual interface operatively associated with the computer, wherein said cinematic sequence of events comprises a first sequence of images, a second sequence of images, and a third sequence of images,
   said method comprising
      recording on the computer memory device
      a digital database having
         a first digital database portion containing the first sequence of images, wherein the first sequence of images appear as viewed from a first person perspective,
         a second digital database portion containing the second sequence of images, wherein the second sequence of images appear as viewed from a third person perspective,
         a third digital database portion containing the third sequence of images, wherein the third sequence of images appear as viewed from a first person perspective,
      wherein a last visual image in the first sequence of images has sequence continuity with a first visual image in the second sequence of images, and
      instructions for causing said computer to retrieve and output to the user through the visual interface
         the first sequence of images,
         the second sequence of images, and
         the third sequence of images,
      in response to input by the user of a command to have a character in the interactive movie complete an action.

10. A method as in claim 9 wherein the command is for the user controlled character to complete an action and the second sequence of images is of the user controlled character completing the action.

11. A computer memory device to cause a computer to display a cinematic sequence of events to a computer user who is playing the part of a user-controlled character in an interactive movie being transmitted by the computer to the user through an audio interface and a visual interface operatively associated with the computer, wherein said cinematic sequence of events comprises a first sequence of images, a second sequence of images, and a third sequence of images,
   said computer memory device having recorded thereon
   a digital database having
      a first digital database portion containing the first sequence of images, wherein the first sequence of images appear as viewed from a first person perspective,
      a second digital database portion containing the second sequence of images, wherein the second sequence of images appear as viewed from a third person perspective, and
      a third digital database portion containing the third sequence of images, wherein the third sequence of images appear as viewed from a first person perspective,
   wherein a last visual image in the first sequence of images has sequence continuity with a first visual image in the second sequence of images, and
   instructions for causing said computer to retrieve and output to the user through the visual interface
      the first sequence of images,
      the second sequence of images, and
      the third sequence of images,
   in response to input by the user of a command to have a character in the interactive movie complete an action.

12. A computer member device as in claim 11 wherein the instructions are for causing the computer to output the images in response to input by the user of a command for the user controlled character to complete an action, and the second sequence of images is of the user controlled character completing the action.

13. A method for using a computer to alter the meaning of a sequence of a first clip and a second clip output to a computer user who is playing the part of a user-controlled character in an interactive movie comprising a sequence of clips being transmitted by the computer to the user through an audio interface and a visual interface operatively associated with the computer,
   wherein the user controls the user-controlled character by inputting commands to the computer to have the user-controlled character complete actions,
   wherein the first clip is of the user-controlled character completing an action, and
   the second clip is of another character acting in response to the completed action of the user-controlled character,
   said method comprising
      storing a third clip in a computer memory device operatively associated with the computer,
      storing, in the computer memory device, the commands input by the user to have the user-controlled character complete actions, and
      outputting the third clip to the user between the output of the first clip and the second clip when the commanded action has a predetermined relationship with at least one previous command.

14. A method as in claim 13 wherein
   the predetermined relationship between the commanded action and the at least one previous command is identity with the at least one previous command.

15. A method as in claim 13 wherein the meaning of the output of the first clip, the third clip, and the second clip, is different from the meaning of the output of the first clip and the second clip.

16. A method as in claim 13 wherein the cinematic effect of the output of the first clip, the third clip, and the second clip is different from the cinematic effect of the output of the first clip and the second clip.

17. A method as in claim 13 within the first clip is a third person view of the user controlled character completing the action and third clip is a close-up shot of the other character from a first person view.

18. A method as in claim 14 wherein the third clip is a close up shot of the other character commenting on having previously acted in response to the completed action of the user-controlled character.

19. A method for making a computer memory device for causing a computer to alter the meaning of a sequence of a first clip and a second clip output to a computer user who is playing the part of a user-controlled character in an interactive movie comprising a sequence of clips being transmitted by the computer to the user through an audio interface and a visual interface operatively associated with the computer, said method comprising
recording on the computer memory device
a digital database having
a first digital database portion containing images of the user-controlled character completing an action, and
a second digital database portion containing images of another character acting in response to the completed action of the user-controlled character, and
a third digital database portion containing images of the other character commenting on the completed action of the user controlled character,
instructions for causing said computer to store, in a computer memory device, the commands input by the user to have the user-controlled character complete actions,
instructions for causing the computer to output the third digital database portion to the user between the output of the fist digital database portion and the second digital database portion when a commanded action has a predetermined relationship with at least one previous command.

20. A method as in claim 19 wherein the meaning of the output of the first digital database portion, the third digital database portion, and the second digital database portion, is different from the meaning of the output of the first digital database portion and the second digital database portion.

21. A method as in claim 19 wherein the instructions cause the third digital database portion to be output when a commanded action has identity with a previously commanded action as stored in the computer memory device.

22. A computer memory device for causing a computer to alter the meaning of a sequence of a first clip and a second clip output to a computer user who is playing the part of a user-controlled character in an interactive movie comprising a sequence of clips being transmitted by the computer to the user through an audio interface and a visual interface operatively associated with the computer, said computer memory device having recorded thereon
a digital database having
a first digital database portion containing images of the user controlled character completing an action, and
a second digital database portion containing images of another character acting in response to the completed action of the user-controlled character, and
a third digital database portion containing images of the other character commenting on the completed action of the user controlled character;
instructions for causing said computer to store, in a computer memory means, the commands input by the user to have the user-controlled character complete actions, and
instructions for causing the computer to output the third digital database portion to the user between the output of the first digital database portion and the second digital database portion when a commanded action has a predetermined relationship with at least one previous command.

23. A computer memory device as in claim 22 wherein the meaning of the output of the first digital database portion, the third digital database portion, and the second digital database portion, is different from the meaning of the output of the first digital database portion and the second digital database portion.

24. A computer memory device as in claim 22 wherein the instructions cause the third digital database portion to be output when a commanded action has identity with a previously commanded action as stored in the computer memory means.

25. A method for using a computer to convey a comment to a computer user who is playing the part of a user-controlled character in an interactive movie being transmitted by the computer to the user through an audio interface and a visual interface operatively associated with the computer, wherein the comment is conveyed to the user by a another character in the interactive movie in response to a command input to the computer by the user to have the user-controlled character complete an action, said method comprising causing the computer to output a visual image of the other character on the visual interface in response to the command input by the user to have the user-controlled character complete an action, and
causing the computer to output the comment through the audio interface, said comment being output in coordination with speaking movements of the other character on the visual interface.

26. A method as in claim 25 wherein the output of the visual image and the comment follows completion of the commanded action by the user controlled character.

27. A method as in claim 26 wherein the commanded action pertains to having the user-controlled character interact with the other character.

28. A method as in claim 27 wherein the visual image and comment are stored in a computer memory device operatively associated with the computer and are retrievable for output to the user in response to any of a plurality of predetermined command combinations input by the user during the course of the interactive movie.

29. A method as in claim 28 wherein one of the predetermined command combinations occurs when the user inputs a command to have the user-controlled character complete a previously commanded action.

30. A method as in claim 29 wherein the comment pertains to the predetermined command combination.

31. A method as in claim 30 wherein the predetermined command combination occurs when the user controlled character asks a previously asked question of the other character.

32. A method as in claim 27 further comprising
causing the computer to output a visual image of the user-controlled character complete the commanded action as viewed from a third person perspective; and
causing the computer to output the visual image of the other character on the visual interface as viewed from a first person perspective of the user controlled character.

33. A method as in claim 32 wherein the visual image of the other character is a close-up shot.

34. A method as in claim 33, further comprising, following completion of the close-up shot and the comment, causing the computer to output a visual image of an environment which includes the other character with the cinematic relationship between the close-up image on the visual image of the environment which includes the other character being characterized as a cut.

35. A method as in claim 34 wherein the visual image of the environment which includes the other character is an over-the-shoulder shot of the user controlled character.

36. A method for a computer user who is plying the part of a user controlled character in an interactive movie being transmitted by the computer to the user through an audio interface and a visual interface operatively associated with the computer to input a command to the computer, wherein said method for inputting the command comprises displaying an icon representing the command on the visual interface;

dragging the icon onto an image appearing on the visual interface; and dropping the icon onto the image.

37. A method as in claim 36 wherein the image is of a character in the interactive movie.

38. A method as in claim 37 wherein the command causes the character to output a dialogue line through the audio interface.

39. A method as in claim 38 wherein the interactive movie comprises a storyline composed of a main sequence of events output to the user from the computer through the audio interface and the visual interface, and the icon represents an event from the storyline.

40. A method as in claim 39 wherein the dialog line conveys information related to the event represented by the icon.

41. A method as in claim 36 wherein the user plays the part of a user controlled character by inputting commands to the computer to have the user-controlled character complete actions, and the commands are input by dragging and dropping the icon.

42. A method as in claim 41 wherein the command is for the user controlled character to interact with another character and the image onto which the icon is dropped is that the other character.

43. A method as in claim 42 wherein the command causes the computer to output an image of the user controlled character completing the commanded action from a third person point of view.

44. A method as in claim 43 wherein the command further causes the computer to output an image of the other character responding to the completed action of the user controlled character.

45. A method for making a computer memory device which enables a computer user who is playing the part of a user controlled character an interactive movie being transmitted by the computer to the user through an audio interface and a visual interface operatively associated with the computer to input a command to the computer to cause the user controlled character complete an action said method comprising
  recording on the computer memory device
    a digital database having
      a first digital database portion containing images of a user-controlled character completing an action, and
      a second digital database portion containing images of another character acting in response to the completed action of the user-controlled character,
    instructions for causing the computer to display an image of an icon representing a command for the user controlled character to complete the action on the visual interface;
    instructions for causing the computer to move the and drop the image of the icon in response to user commands, and
    instructions for causing the computer to output the first digital database portion and the second digital database portion in response to the user dropping the icon on a selected hot spot on the visual interface.

46. A method as in claim 45 further comprising recording, on the computer memory device
  a plurality of different second digital database portions containing images of different characters acting in response to the completed action of the user-controlled character; and
  instructions for causing the computer to select a second digital database portion for output based on the selected hot spot.

47. A method as in claim 46 wherein the first digital database portion contains images from a third person point of view and the second digital database portion contains images from a first person point of view.

48. A computer memory device which enables a computer user who is playing the part of a user controlled character an interactive movie being transmitted by the computer to the user through an audio interface and a visual interface operatively associated with the computer to input a command to the computer to cause the user controlled character complete an action,
  said computer memory device having recorded thereon
    a digital database having
      a first digital database portion containing images of a user-controlled character completing an action, and
      a second digital database portion containing images of another character acting in response to the completed action of the user-controlled character,
    instructions for causing the computer to display an image of an icon representing a command for the user controlled character to complete the action on the visual interface;
    instructions for causing the computer to move the and drop the image of the icon in response to user commands, and
    instructions for causing the computer to output the first digital database portion and the second digital database portion in response to the user dropping the icon on a selected hot spot on the visual interface.

49. A computer memory device as in claim 48 further comprising
  a plurality of different second digital database portions containing images of different characters acting in response to the completed action of the user-controlled character; and
  instructions for causing the computer to select a second digital database portion for output based on the selected hot spot.

50. A computer memory device as in claim 49 wherein the first digital database portion contains images from a third person point of view and the second digital database portion contains images from a first person point of view.

* * * * *